United States Patent [19]

Lemmer

[11] 4,256,220
[45] Mar. 17, 1981

[54] COMPONENT-INSERTION TABLE FOR PRINTED WIRING BOARDS

[76] Inventor: Alfred Lemmer, Machtlfingerstrasse 24, D-8000 Munchen 70, Fed. Rep. of Germany

[21] Appl. No.: 897,056

[22] Filed: Apr. 17, 1978

[30] Foreign Application Priority Data

Apr. 22, 1977 [DE] Fed. Rep. of Germany ... 7712802[U]

[51] Int. Cl.³ .............................................. B65G 13/02
[52] U.S. Cl. .................................... 198/778; 312/268
[58] Field of Search ................ 312/268; 198/778, 793, 198/796, 797

[56] References Cited

U.S. PATENT DOCUMENTS

| 1,523,971 | 1/1925 | Johnsen | 198/778 X |
| 2,664,188 | 12/1953 | Rhodes | 198/778 X |
| 3,290,104 | 12/1966 | Brautovich | 312/268 X |
| 3,360,097 | 12/1967 | Huffman et al. | 198/778 X |

FOREIGN PATENT DOCUMENTS

| 7512151 | 4/1975 | Fed. Rep. of Germany | 198/793 |
| 951946 | 3/1964 | United Kingdom | 312/268 |

Primary Examiner—Robert B. Reeves
Assistant Examiner—Douglas D. Watts
Attorney, Agent, or Firm—Fitzpatrick, Cella, Harper & Scinto

[57] ABSTRACT

A component insertion table for wiring boards in which an endless chain belt carries component pickup trays along the table top. The chain is formed in two loops each having one portion extending one over the other in different planes and each having a second portion in the same plane but separated laterally from each other. This arrangement permits a large number of pickup trays to be carried on a given size table.

3 Claims, 8 Drawing Figures

COMPONENT-INSERTION TABLE FOR PRINTED WIRING BOARDS

BACKGROUND OF THE INVENTION

1. Field of the Invention

This invention relates to component-insertion tables for wiring boards and more particularly it concerns a novel endless chain belt arrangement for moving component pickup trays along such tables.

2. Description of the Prior Art

German Gebrauchsmusterschrift No. 7,512,151 discloses a prior art component-insertion table having an endless chain belt which runs in a single plane. This endless chain belt is used to move component pickup trays along the table top. In this prior art arrangement the number of pickup trays that can be moved at any one time is limited by the size of the table top, i.e. its length and width.

SUMMARY OF THE INVENTION

The present invention improves over the above described prior art in that it provides a novel component insertion table which is capable of moving a greater number of pickup trays with a chain belt than has heretofore been possible with prior art tables and without having to increase the length and width of the table top. In accordance with the invention this is achieved by novel arrangements according to which the chain belt is guided in at least two stacked planes.

Particularly simple guidance for the chain belt is obtained when it is guided in at least two loops arranged such that a first portion of each loop extends in a separate plane with the first portions of all loops extending directly on top of each other. A second portion of each loop passes from one plane to another and these second portions of the loops are laterally offset relative to each other when viewed from the top. This offset arrangement precludes interference between the crossing chain-belt portions and the pickup trays attached to them. The aforementioned first portions of the loops which extend directly on top of each other may be run over end rolls disposed on a common shaft.

The present invention, in another aspect, solves another problem which occurs in prior art component insertion tables. In those tables difficulties have arisen due to the fact that the chain belt frequently comes off the end sprocket wheels when it is deflected from one plane to another. This drawback could not be overcome even by arranging the end sprocket wheels at an angle to the plane from which they were to deflect the chain belt into another plane. The present invention, however, avoids this problem in a different way. According to the invention, the sprocket wheels which deflect the chain belt from one plane to another are each provided with a guide disk which is disposed on the side of the sprocket wheel facing the plane to or from which the chain belt is to be or has been deflected. This guide disk has a diameter equal to or greater than that of its associated end sprocket wheel.

According to a further refinement the deflecting action of the guide disk is enhanced by providing a bevel or angle around the rim portion of the guide disk. The surface of this bevel or angle faces the chain belt outwardly toward the plane to which or from which the chain belt is deflected.

BRIEF DESCRIPTION OF THE DRAWINGS

An embodiment of the invention is described below with reference to the drawings, where.

DETAILED DESCRIPTION OF THE PREFERRED EMBODIMENT

Figure 1:
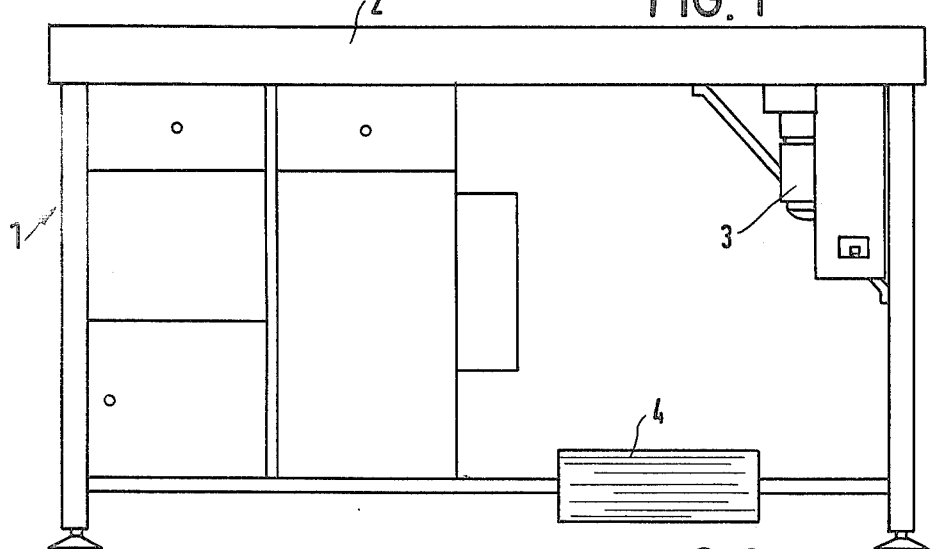
FIG. 1 is a front elevational view of a component-insertion table in accordance with the invention.
Figure 2:
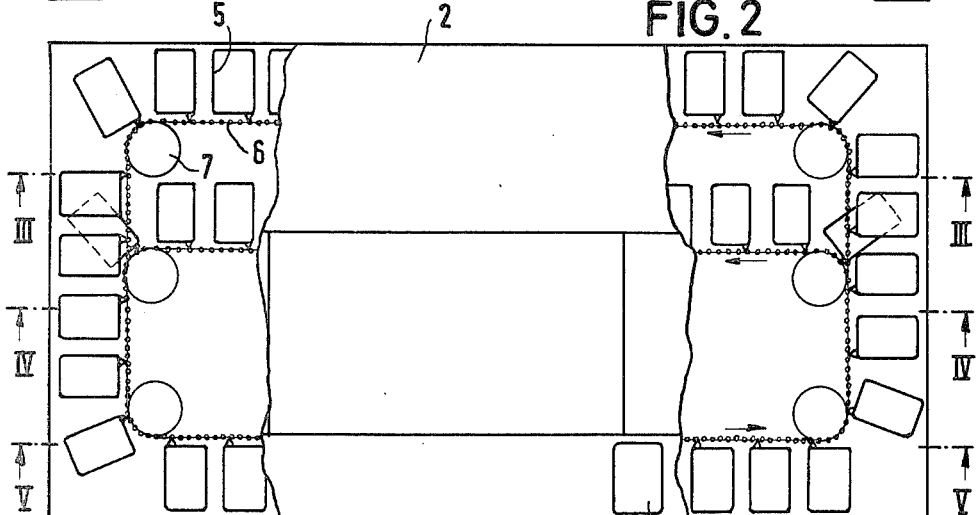
FIG. 2 is a top plan view of the component-insertion table with the surface layer of the table top partly broken away.
Figure 3:
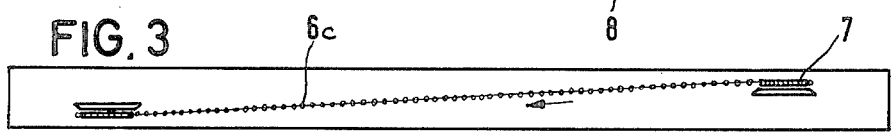
FIG. 3 is a section through FIG. 2 taken along the line III—III.
Figure 4:
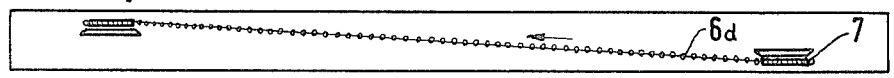
FIG. 4 is a section through FIG. 2, taken along the line IV—IV.

As shown in FIGS. 1–5 a component insertion table 1, according to the present invention, has a hollow table top 2 in which an endless chain belt 6 is disposed. The chain belt 6 is led over end sprocket wheels 7 and runs in two planes. Pickup trays 5 are fixed to the chain belt 6. One selected pickup tray is accessible at a time through an access opening 8 in the upper surface of the table top 2.

One of the sprocket wheels 7 is driven by means of a motor 3 (FIG. 1). A pedal 4 is provided with a switch and suitable circuit means (not shown) to permit the motor 3 to be switched on and off.

Figure 5:
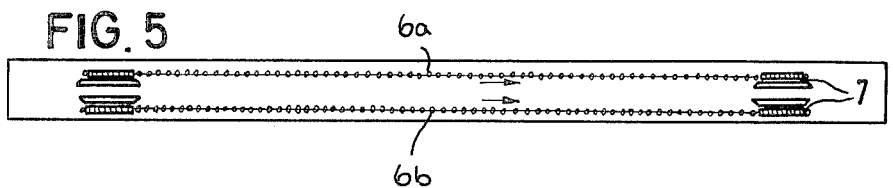
FIG. 5 is a section through FIG. 2, taken along the line V—V.

From FIGS. 3 to 6 it can be seen that the chain belt 6 forms two loops. Each loop has a first portion 6a and 6b (FIGS. 5 and 6), and the first portions of the two loops extend directly on top of each other. The end sprocket wheels 7 in FIG. 5 are disposed on the same shaft. Each loop further has a second portion 6c (FIGS. 3 and 6) and 6d (FIGS. 4 and 6) which passes from one plane into an adjacent plane. Viewed from above, these second portions of the loops are laterally offset relative to each other.

Figure 6:
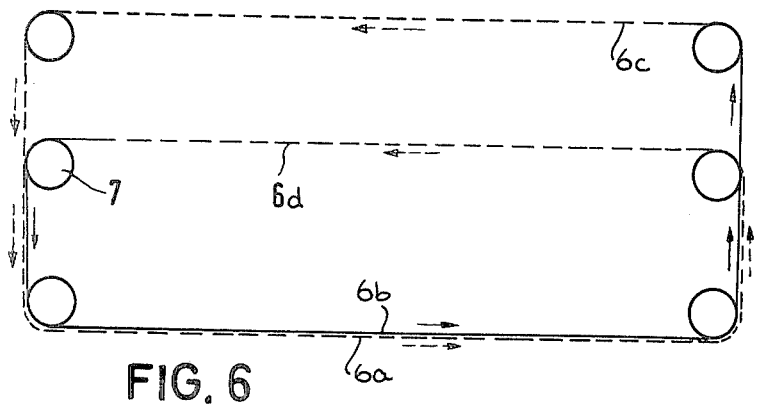
FIG. 6 is a diagrammatic representation of the course of a chain belt used in the table of FIG. 1 as viewed from above.

In FIG. 6, the upper portions of the chain belt 6 are indicated by a solid line and the lower portions by a dashed line. In the portions of the chain belt indicated by both solid and dashed lines, there is a passing from one plane into another.

Figure 7:
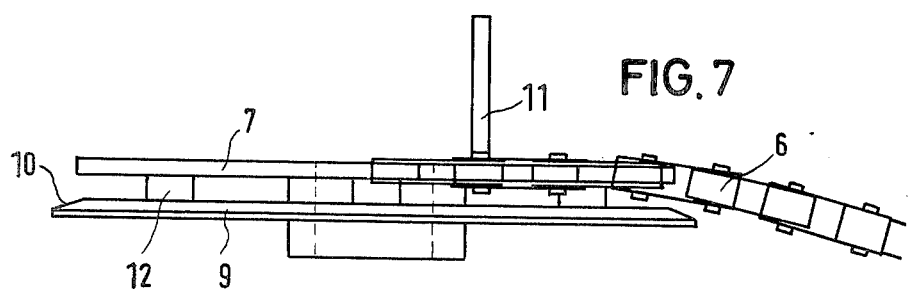
FIG. 7 is a side elevation of an end sprocket wheel with chain and guide disk used in the table of FIG. 1.
Figure 8:
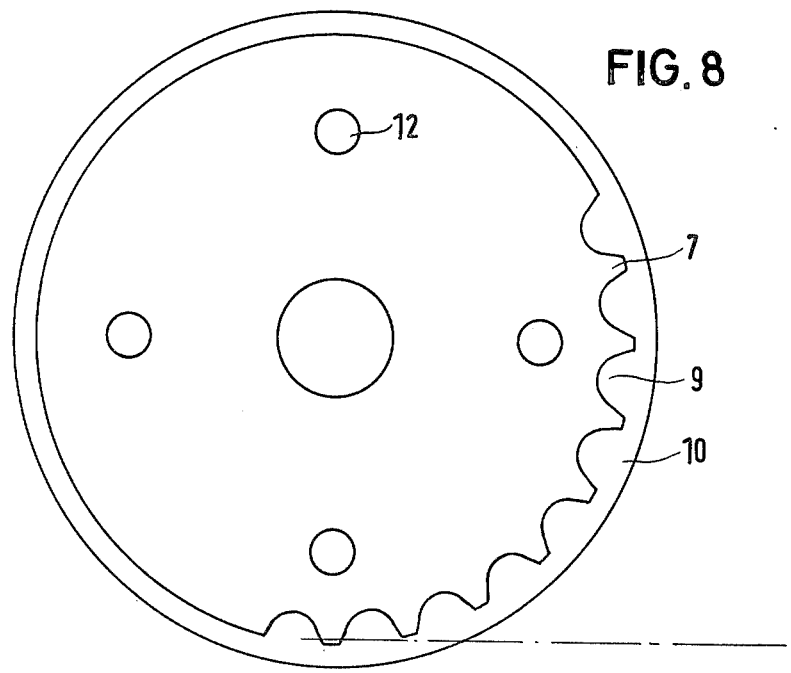
FIG. 8 is a plan view of the end sprocket wheel and guide disk shown in FIG. 7.

From FIGS. 7 and 8 it can be seen that each end sprocket wheel 7 is fixed by bolts 12 to a guide disk 9 disposed parallel to the end sprocket wheel 7. Each guide disk 9 is disposed on the side of its associated sprocket wheel 7 which faces toward the plane to which or from which the chain at the sprocket wheel extends. The diameter of the guide disk 9 is at least as great and is preferably somewhat larger than that of the end sprocket wheel 7. Moreover, the rim portion 10 of the guide disk 9 is angled outwardly toward the plane to which or from which the chain belt at the sprocket wheel 7 extends.

From the foregoing it will be appreciated that with the chain belt loop arrangement described herein a greater number of trays 5 may be carried simultaneously along the table 1 than was heretofore possible. Also, the arrangement of the guide disks 9 with angled rim portions 10 provide reliable guidance for the chain belt 6 so that it will remain engaged with the sprocket wheels 7 as it moves from one plane to another.

What is claimed and desired to be secured by Letters Patent is:

1. A component-insertion table for wiring boards comprising a hollow table top of relatively short height supported on top of relatively long legs, an endless chain belt to which pickup trays for the components are secured, and guide means arranged to support said endless chain belt for movement in said hollow table top, said guide means being disposed to support said chain belt in two stacked loops, each loop extending around the table top in a different plane except for a single portion of each loop which extends from one plane to the other, said single portions of each loop being laterally offset relative to each other.

2. A component-insertion table as defined in claim 1 wherein said guide means comprises sprocket wheels over which said chain belt extends, said sprocket wheels being arranged to deflect the chain belt from one plane to another, said sprocket wheels having fixed to the side thereof facing the plane, to which or from which the chain at that sprocket wheel extends, a guide disk having a diameter at least as great as said sprocket wheel.

3. A component-insertion table as defined in claim 2, wherein the rim portion of the guide disk facing the chain belt is angled outwardly toward the plane to which or from which the chain belt at that sprocket wheel extends.

* * * * *